United States Patent

[11] 3,547,061

[72] Inventor Louis J. Kush, Jr.
 State College, Pa.
[21] Appl. No. 351,575
[22] Filed Mar. 12, 1964
[45] Patented Dec. 15, 1970
[73] Assignee the United States of America as represented by the Secretary of the Navy. by mesne assignments

[54] NOISE LIMIT GATE
 6 Claims, 3 Drawing Figs.
[52] U.S. Cl. ............................................. 114/23, 340/3
[51] Int. Cl. ...................................... F42b 19/08, F24b 19/06, F42b 19/01
[50] Field of Search............................................ 114/23, 21.1; 340/3, 3A Primary Examiner—Samuel W. Engle
Assistant Examiner—Thomas H. Webb
Attorneys—Q. B. Warner, V. C. Muller and P. H. Firsht ABSTRACT: In an acoustic homing torpedo having the capacity of emitting an initial acoustical pulse, allowing said pulse to echo from a target vessel, receiving the echo from said pulse and directing itself on a collision course with said vessel, the combination comprising: an amplifier circuit: a resonating device connected to said amplifier circuit, tuned to the frequency spectrum of the reverberation frequencies of said emitted acoustical pulse; a rectifying device connected to the output of said first amplifier circuit adapted to rectify the output thereof: a relay driver circuit connected to the output of said rectifier circuit adapted to amplify the current received from said rectifier circuit; a switching device connected to said relay driver circuit operable at a current value present when the reverberation signal from said emitting pulse becomes equal or less than the self-noise signal from said torpedo.

LOUIS J. KUSH, JR.
INVENTOR.

LOUIS J. KUSH, JR.
INVENTOR.

NOISE LIMIT GATE

This invention relates to electronic gates and in particular to a gate capable of presenting high impedance to a particular frequency spectrum.

The use of acoustic-homing torpedoes in modern warfare is well known. Frequently, these torpedoes operate on an active acoustical system, that is, a system whereby the torpedo emits an acoustical pulse that is transmitted through the water to a target vessel, echoes from this vessel and returns to the torpedo where it is analyzed by a self-contained electronic system. This system then directs the torpedo to the target vessel.

The acoustic-homing system of the torpedo should not be activated immediately after the emission of the acoustic pulse in that the reverberation caused by the pulse going through the water may give the homing system a false signal. Hence there should be a time delay from the time the acoustic pulse or "ping" is emitted before the homing system is turned on to receive the echo from the target vessel. A simple timing device within the torpedo does not satisfactorily solve this delay problem since the reception of echo pulses from the target vessel may widely vary in time depending upon the distance from the torpedo to the vessel, the temperature and density of the sea water the number of microorganisms, sediment present in the sea water and other factors.

The present invention solves this problem by providing a device which will activate the acoustic-homing system of the torpedo only after the reverberation from the emitted acoustical pulse has dropped to a level where it will no longer affect the homing system adversely. In this case the device will activate the homing system only after the reverberation level has lowered to the acoustical level produced by the torpedo itself or the self-noise level of the torpedo.

This result is achieved by providing an electronic device having one or more amplifiers which have cathode connected "tank" circuits, connected in cascade. The output of the last stage is connected to a rectifier, from the rectifier to a relay drive device and then connected to a relay capable of activating the torpedo-homing system.

It is an object of this invention therefore to provide a device which will activate an acoustic-homing system of a torpedo when the reverberation level from an emitted acoustic pulse has reached a predetermined level.

It is another object of this invention to provide a device which will detect when the reverberation-to-noise ratio of acoustical frequencies approaches unity.

These and other objects of this invention may be more fully understood with reference to the below description and drawings in which.

Figure 1:
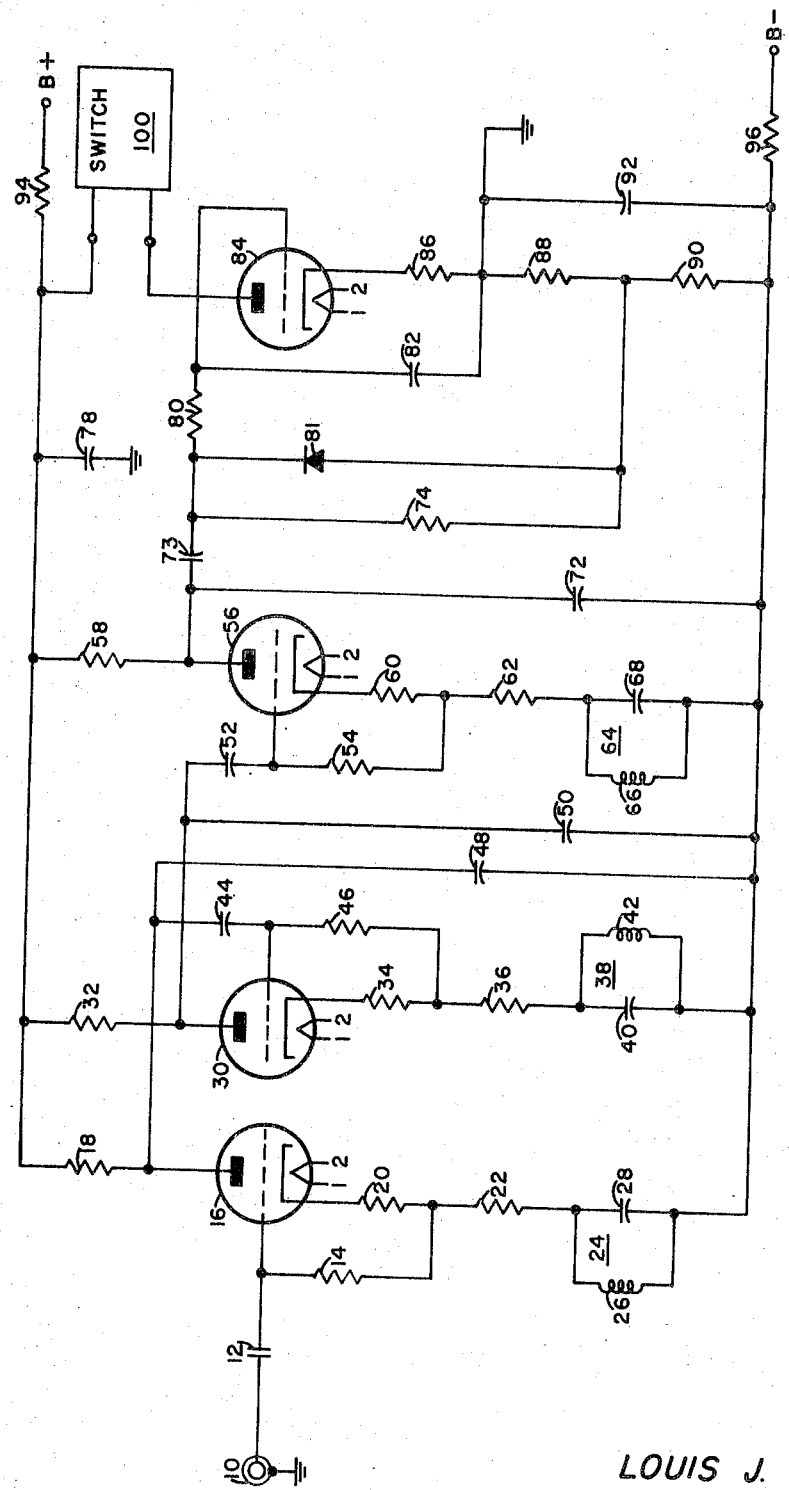
FIG. 1 shows a schematic diagram of the electronic circuitry of this invention.

Referring now to FIG. 1, it will be seen that the invention basically is comprised of three capacitively coupled tuned stages plus a rectifier, a relay driver, and a switch, comprised generally of tubes 16, 30, 56, 81, and 84, and switch 100 and associated circuits respectively. A hydrophone is connected through coaxial cable 10, the outer portion of which is grounded, and coupling capacitor 12 to the grid of tube 16. The plates of tubes 16, 30, and 56 are each coupled through plate load resistors 18, 32, and 58 to a source of positive bias voltage grounded through capacitor 78 and passing through positive bias resistor 94 to a B+ supply.

The cathode of tube 16, 30, and 56 are each connected to a common source of B− voltage connected through B− load resistor 96 in the following manner: The cathode of tube 16 is connected through bias resistor 20, load resistor 22, resonator 24, comprised of parallely connected inductor 26 and capacitor 28 to the source of negative bias voltage. The cathode of tube 30 is similarly connected to the source of negative bias voltage through bias resistor 34, load resistor 36, and resonator 38, comprised of parallely connected inductor 42 and capacitor 40. The cathode of tube 56 is connected to the source of negative bias voltage through bias resistor 60, load resistor 62, and resonator 64, comprised of parallely connected capacitor 68 and inductor 66. Grid return resistors 14, 46, and 54 are connected from the grids of tubes 16, 30, and 56 to the junction between resistors 20 and 22, 34 and 36, and 60 and 62 respectively. The plate of tube 16 is coupled to the grid of tube 30 through coupling capacitor 44; and the plate of tube 30 is coupled to the grid of tube 56 through coupling capacitor 52. The plates of tubes 16, 30, and 56 are each coupled to the source of negative bias voltage through high frequency bias capacitors 48, 50, and 72 respectively.

The plate of tube 56 is coupled to the positive terminal of rectifier 81 through coupling capacitor 73 and coupling resistor 74, while the negative terminal of rectifier 81 is coupled to resistor 80 through the grid of tube 84. Capacitor 73 is coupled directly to resistor 80 as well.

The cathode of tube 84 is coupled to the source of negative bias voltage through bias resistor 86, load resistor 88, and load resistor 90. The grid of tube 84 is likewise coupled through capacitor 82 to ground, while the B− voltage source is coupled through resistor 96 and capacitor 92 to ground. Plate of tube 84 is coupled to switch 100, resistor 94 to the source of B+ voltage.

In operation, the launched acoustical-homing torpedo guided by gyroscopic means, emits an acoustical pulse or "ping" from a source within the torpedo. This acoustical pulse travels from the torpedo to the target vessel producing reverberation from the water as it proceeds. The hydrophone receives the signals of reverberation, self-noise, etc., and passes the corresponding signal voltage through coaxial cable 10 through capacitor 12 to the grid of tube 16. Resonators 24, 38, and 64 of tubes 16, 30, and 56 are tuned to the frequency spectrum to be expected from the reverberation signal received.

For the purpose of illustration, resonator 38 is tuned to frequency $f_o$, which is the center frequency of the reverberation band. Resonators 24 and 64 are tuned to frequencies on each side of the $f_o$ near the limits of the frequency spectrum of the reverberation. When the reverberation frequencies activate the resonators 24, 38, and 64, a high impedance is produced at their terminals. Thus the resonators produce a gain of much less than unity. Likewise, the self-noise of the torpedo received through hydrophone is not blocked by the resonators.

The signal from the plate of tube 56 passes through coupling capacitor 73 is rectified by rectifier 81 thence passes through the grid of tube 84. Here the signal is amplified to produce a direct current capable of actuating the switching device 100 thereby causing the acoustic-homing system of the torpedo to turn on. The above described procedure is repeated after each pulse emitted by the torpedo. The rate at which the pulses are emitted is determined by the range of the target. As the torpedo nears the target vessel the pulse rate increases.

Figure 2:
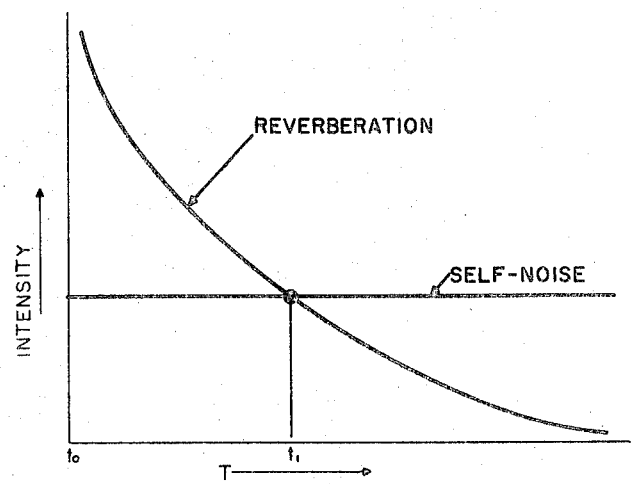
FIG. 2 is a graphical representation showing the intensity of noise and reverberation of an acoustic-homing torpedo plotted against time.

Referring now to FIG. 2, there is shown a graphical representation of noise intensity and reverberation as varying with time. Since reverberation is produced in many varying ways and therefore, the duration of the reverberation is variable. The invention is designed to detect when the intensity of the reverberation falls below that of torpedo self-noise, here the intersection of the reverberation curve with the self-noise curve. When this condition occurs, the noise gate energizes relay 100 which turns on the homing system. As may be seen seen, at time $t_o$ when the initial acoustical pulse is emitted by the torpedo, the reverberation received by the hydrophone is maximum. This reverberation signal decreases until it becomes equal to the self-noise of the torpedo, also received by the hydrophone. At this point, tube 84 transmits sufficient current through switch 100 to actuate it, thus turning on connected acoustic-homing system and deactuating the gyroscopic control of the torpedo.

Figure 3:
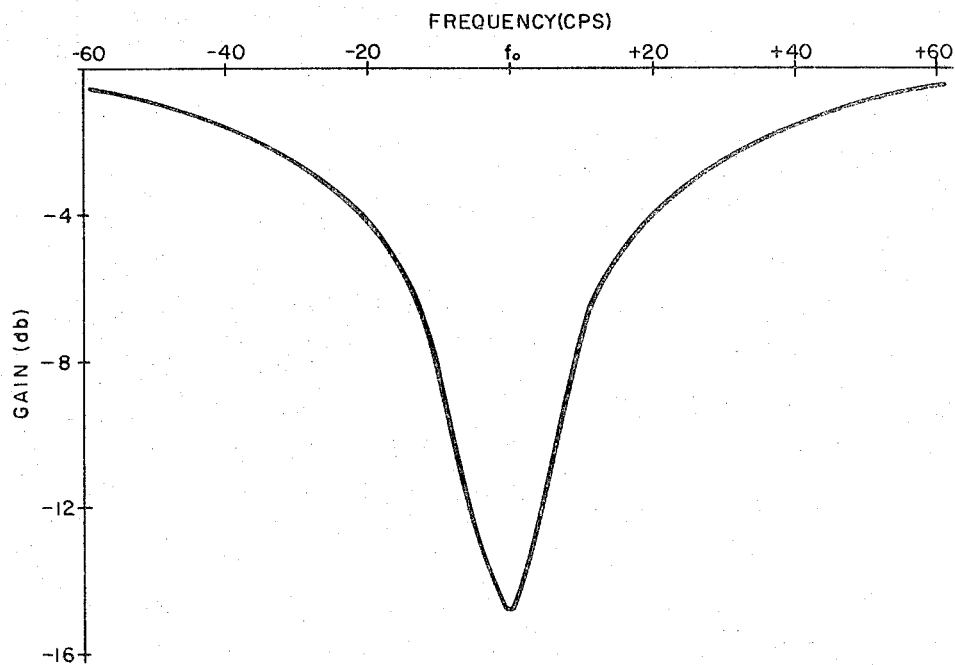
FIG. 3 is a graphical representation showing how the gain of the device of FIG. 1 varies with frequency.

Referring to FIG. 3, the impedance effect of the first tube stages 16, 30, and 56 of the device is shown. Here it may be seen that as the frequency increases on the abscissa from O to $f_o$, the total impedance of the device, or the negative gain as measured in decibels, increases and becomes maximum as a frequency of $f_o$ cycles per second. In the present embodiment $f_o$ is the mean frequency of reverberation. Hence, the negative gain decreases from $f_o$ cycles per second asymptotically. As is clearly indicated, the great impedance or lack of gain is had by the device at frequencies around $f_o$, or the frequencies of the reverberation.

As explained, this device is so constructed that tank circuits are tuned to the frequency range of reverberation received from the emitted acoustical pulse. In addition, the amplifier tubes are biased to produce unity gain when the tank circuits are not in resonance. Therefore, it is apparent that when the received signal contains a larger portion of reverberation than of torpedo self-noise, the impedance of the cathode circuit of the amplifier is greater than the impedance of the plate circuit. This condition results in a gain well below unity.

Conversely, when the level of reverberation drops below the level of the self-noise, the gain of the amplifiers approaches unity. The output of the amplifiers is rectified and then applied to a relay driver stage where the current is amplified sufficiently to operate a relay. When the relay is tripped, the homing circuits are prepared to receive the true echo from the target vessel. This process is repeated each time a ping is emitted from the torpedo. A large current supply in the relay will activate an armature which will turn off the torpedo "gyro" guidance system and activate the acoustical-homing system which will then direct the torpedo towards the target vessel. As the torpedo continues to emit acoustical pulses or "ping" the process will be repeated.

Although this invention has been described with a degree of particularity it is to be understood that the modifications of the device are contemplated and do not depart from the spirit of the invention.

I claim:

1. In an acoustic-homing torpedo having the capacity of emitting an initial acoustical pulse, allowing said pulse to echo from a target vessel, receiving the echo from said pulse and directing itself on a collision course with said vessel, the combination comprising:
   an amplifier circuit;
   a resonating device connected to said amplifier circuit, tuned to the frequency spectrum of the reverberation frequencies of said emitted acoustical pulse;
   a rectifying device connected to the output of said first amplifier circuit adapted to rectify the output thereof;
   a relay driver circuit connected to the output of said rectifier circuit adapted to amplify the current received from said rectifier circuit;
   a switching device connected to said relay driver circuit operable at a current value present when the reverberation signal from said emitting pulse becomes equal or less than the self-noise signal from said torpedo.

2. The apparatus as described in claim 1 in which said amplifier is comprised of three-tuned amplifier circuits each with attached resonators capable of resonation at frequency spectrum of reverberation received by said torpedo from said initial emitted acoustical pulse.

3. The combination as claimed in claim 2 in which said resonating circuit is comprised of a parallely connected inductance and capacitance circuit in the cathode circuit of said amplifier.

4. The combination as claimed in claim 3 in which an acoustical-homing system is connected to the output of said switching device whereby upon the switching of said device, said torpedo will be guided in its path by said acoustic-homing system.

5. The combination as claimed in claim 4 in which the electrical signals received by said first amplifier circuit originate from an acoustical hydrophone and an electronic-limiter circuit connected to said hydrophone.

6. In a torpedo having an acoustical-homing capacity, the method of determining when the reverberation signals from an emitted acoustical pulse becomes less than the self-noise signal generated by the torpedo, the steps comprising:
   applying output signals of a marine hydrophone to a resonating circuit adapted to produce high impedance at frequencies of received acoustical reverberation;
   applying the output of said resonating circuit to a rectifier circuit to produce a direct current signal;
   applying the output of said rectifier circuit to a switching device connected said torpedo acoustic-homing system;
   whereby when said received acoustical signal contains reverberation, the impedance of said resonant circuit becomes high causing said first amplifying tube to become nonconductive preventing such switching device from being operative.